W. JOHNSON.
SPEED GOVERNOR.
APPLICATION FILED JULY 30, 1919.
1,371,767.
Patented Mar. 15, 1921.
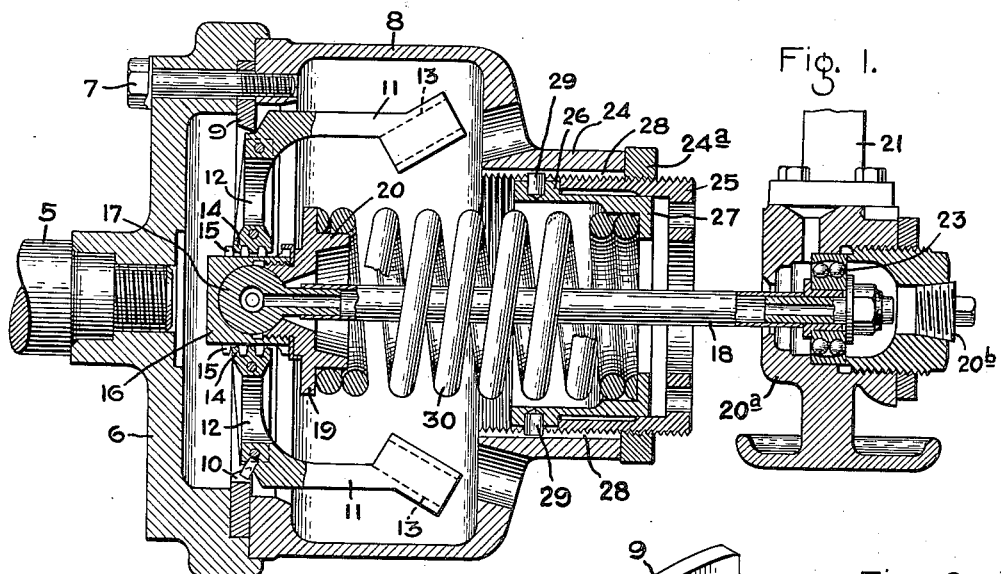
Fig. 1.
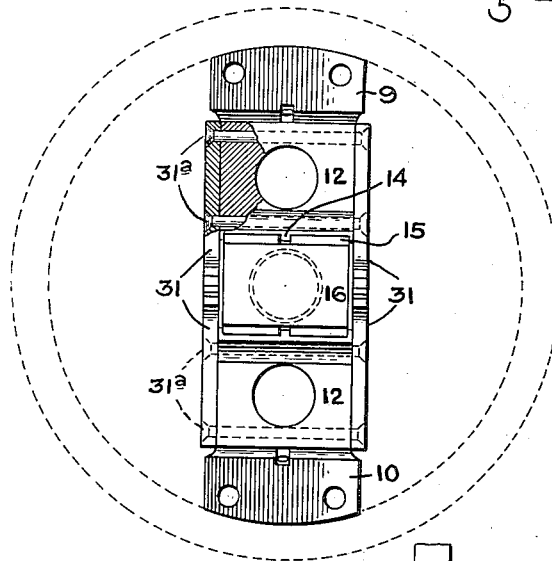
Fig. 2.
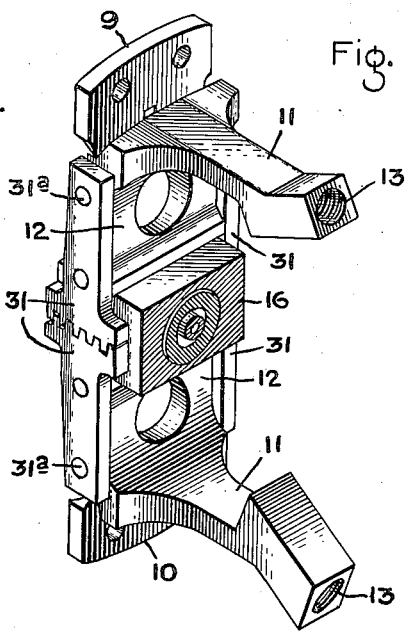
Fig. 3.
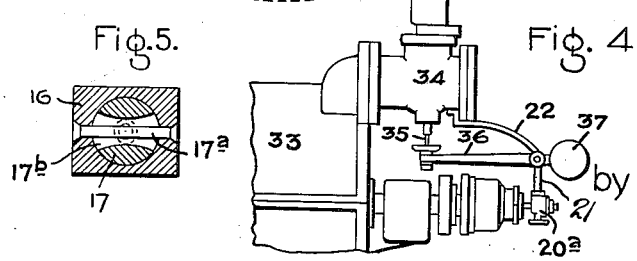
Fig. 5.     Fig. 4.
Inventor,
Werner Johnson,
by
His Attorney.

UNITED STATES PATENT OFFICE.

WERNER JOHNSON, OF LYNN, MASSACHUSETTS, ASSIGNOR TO GENERAL ELECTRIC COMPANY, A CORPORATION OF NEW YORK.

SPEED-GOVERNOR.

1,371,767.      Specification of Letters Patent.      Patented Mar. 15, 1921.

Application filed July 30, 1919. Serial No. 314,338.

*To all whom it may concern:*

Be it known that I, WERNER JOHNSON, a citizen of the United States, residing at Lynn, in the county of Essex, State of Massachusetts, have invented certain new and useful Improvements in Speed-Governors, of which the following is a specification.

The present invention relates to speed governors for use in connection with revolving shafts for regulating the machine of which the shaft forms a part and has for its object to provide an improved structure and arrangement in a governor of this type.

For a consideration of what I believe to be novel and my invention, attention is directed to the accompanying description and the claims appended thereto.

In the drawing, Figure 1 is a longitudinal sectional view of a governor embodying my invention; Fig. 2 is an end view of certain parts; Fig. 3 is a perspective view of certain parts; Fig. 4 shows the governor as used in connection with a turbine, and Fig. 5 is a sectional view through a ball and socket joint.

Referring to the drawing, 5 indicates a shaft, which may be a turbine shaft, for example, and 6 a governor hub fixed to the end of the shaft and rotating therewith. Fastened to governor hub 6 by means of bolts 7 is a governor casing 8 and clamped between the casing and the hub are diametrically opposed knife edges 9 and 10. Located inside casing 8 are two bell crank levers comprising arms 11 and 12, the bell crank levers being provided at their elbows, with V-shaped seats resting on knife edges 9 and 10. Arms 11 form the governor weights and they are provided with enlarged ends in which are openings or holes 13 into which additional weights may be put to give the desired mass to such parts. Arms 12 are in the form of flat plates provided with holes at their centers to lighten the structure and at their ends they have teeth 14 which mesh with teeth 15 on the surface of a rectangular block 16. Block 16 is provided with a socket in which is located a ball 17 on the inner end of a hollow connecting rod 18. Ball 17 is held in the socket by a member 19 which threads into its open side and has a flange 20 which forms a spring holder. Ball 17 is connected to block 16 by a pin $17^a$ (Fig. 5) which passes through a hole $17^b$ in the ball. The clearance between pin $17^a$ and hole $17^b$ is made large to permit connecting rod 18 to take its own position and also to allow lubricant which is supplied to the interior of the ball as hereinafter explained, to reach the surface of the ball. Member 19 has a central opening through which connecting rod 18 passes. The outer end of connecting rod 18 extends inside a housing $20^a$ on the end of a lever arm 21 which is pivoted on a stationary bracket 22 (Fig. 4) in such manner that it may oscilate in a vertical plane parallel to the axis of the shaft. Within housing $20^a$ is a ball bearing 23 fastened to the end of connecting rod 18 so it may rotate in the housing with little friction.

In casing $20^a$ opposite the end of connecting rod 18 is a hole which is normally closed by a plug $20^b$. By removing plug $20^a$ a squirt gun filled with lubricant may be placed against the end of connecting rod 18 and lubricant forced through the hollow rod into ball 17 to lubricate it. This may be done when the governor is idle or when it is running and the arrangement is of particular advantage in that it permits lubricant being supplied under the latter condition.

Governor casing 8 has an opening through which connecting rod 18 extends and surrounding this opening is a flange 24 threaded on its inner surface to receive a tubular adjusting nut 25. The inner end of nut 25 engages a shoulder 26 on a spring holder 27, and in flange 24 are key ways 28 in which pins 29 in spring holder 27 slide. This arrangement permits spring holder 27 to move longitudinally of flange 24 but prevents it from turning. At $24^a$ is shown a suitable lock nut for locking nut 25 to flange 24. Surrounding connecting rod 18 is a governor spring 30 which at one end engages spring holder 20 and at the other end spring holder 27. By turning adjusting nut 25, spring holder 27 can be moved toward or away from spring holder 20 to adjust the tension of governor spring 30.

With any governor spring whether a tension spring or a compressor spring, the elasticity varies in different convolutions and also in different sections of the same convolution and in order that the governor weights will impart always an even pressure on the spring, I lock the two bell crank levers together so both governor weights must always move together and no relative change in their positions can take place while the governor is in operation. To this end I attach to lever arms 12 segmental gears 31 which mesh with each other and thereby lock lever arms 12 directly together. There are preferably meshing gear segments 31 on each side of the lever arms 12 and they may be fastened thereto by rivets 31ª. With this arrangement it is not possible during operation for one governor weight to move more than the other thereby throwing the governor spring 30 out of alinement.

In Fig. 4 my improved governor is illustrated in connection with an elastic fluid turbine 33 having a valve mechanism 34 for controlling the admission of elastic fluid to the turbine. The stem 35 of valve mechanism 34 is connected to one end of a lever arm 36 the other end of which is connected to lever arm 21. In other words, lever arms 21 and 36 form together a bell crank lever. At 37 is a weight on the end of lever arm 22 for balancing the weight of the moving parts of the valve.

In operation, shaft 5, governor housing 8, governor spring 30 connecting rod 18, rectangular block 16 and the governor weights all revolve, the outer end of connecting rod 18 turning in housing 20ª as is well understood. The governor weights, i. e., lever arms 11, are thrown out by centrifugal force pivoting on knife edges 9 and 10 with the result that connecting rod 18 is moved axially thereby operating valve mechanism 34 through the intermediary of lever arms 21 and 36. Such movements of the governor weights and connecting rod are opposed by the governor spring 30. Owing to the fact that lever arms 12 are locked together by gear segments 31, which means that the governor weights are locked together, one governor weight cannot move more than the other to compress to a greater extent one side of spring 30 thereby throwing such spring out of alinement, but on the contrary the one weight will restrain the other and both will always move by the same amount.

It will also be noted that the governor can be very readily adjusted it being only necessary to turn adjusting nut 25 by means of a suitable tool.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a governor, a shaft, pivot members carried thereby, bell crank levers pivoted at their elbows on said pivot members, one arm of each lever extending in an axial direction and the other having teeth at its end, a block having a socket in it, teeth on said block with which the teeth on said lever arms engage, meshing gear segments carried by said bell crank levers, a connecting rod having a ball at its inner end which fits said socket, said rod having an axial opening which extends from its outer end and terminates in said ball, lubricant for said ball and socket being supplied through such axial opening, an adjustable spring holder, and a governor spring located between such holder and block.

2. In a governor, a shaft, a casing carried by the shaft, said casing having an open end, a spring holder adjustably mounted in said open end, pivot members in said casing, bell crank levers pivoted at their elbows on said pivot members, one arm of each lever extending in an axial direction and the other having teeth at its end, a block having an open-sided socket in it, teeth on said block with which the teeth on said lever arms engage, a connecting rod having a ball at its inner end which fits said socket, said rod having an axial opening which extends from its outer end and terminates in said ball, lubricant for said ball and socket being supplied through said axial opening, and a governor spring located between said spring holder and block.

In witness whereof, I have hereunto set my hand this 26th day of July, 1919.

WERNER JOHNSON.